(12) United States Patent
Freeman et al.

(10) Patent No.: US 6,940,627 B2
(45) Date of Patent: Sep. 6, 2005

(54) CONTROL SYSTEM FOR ELECTROCHROMIC DEVICES

(75) Inventors: William Freeman, Castro Valley, CA (US); David Rosseinsky, Exeter (GB); Hong Jin Jiang, Singapore (SG); Andrew Soutar, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/697,766

(22) Filed: Oct. 30, 2003

(65) Prior Publication Data

US 2005/0046920 A1 Mar. 3, 2005

Related U.S. Application Data

(60) Provisional application No. 60/422,824, filed on Oct. 30, 2002.

(51) Int. Cl.[7] .................................................. G02F 1/15
(52) U.S. Cl. ....................................................... 359/265
(58) Field of Search ................................. 359/265–275; 430/32, 34, 38; 345/107, 105; 204/600, 450

(56) References Cited

U.S. PATENT DOCUMENTS 6,386,713 B1 * 5/2002 Turnbull et al. ............ 359/604

OTHER PUBLICATIONS

Hills, P. PWM Signal Generators, V2.03 [online] Jul. 30, 2002.

Hills, P. Speed Controllers, V2.04 [online] Sep. 19, 2001.

\* cited by examiner

*Primary Examiner*—Hung Xuan Dang
*Assistant Examiner*—Tuyen Tra
(74) *Attorney, Agent, or Firm*—Workman Nydegger

(57) ABSTRACT

A system and method for controlling an electrochromic device is provided. The system comprises a light source that produces an input light signal, and an electrochromic window configured to attenuate the input light signal by a certain amount and transmit a resulting attenuated light signal. An optical detector is configured to detect an optical property of the attenuated light signal, and a power module is connected to the electrochromic window and the detector. The power module generates a pulse-width modulated power signal and inputs the power signal to the electrochromic window. The power signal is modulated by an amount based on the detected optical property of the attenuated light signal. A control circuit for an electrochromic device is also disclosed.

14 Claims, 3 Drawing Sheets

CONTROL SYSTEM FOR ELECTROCHROMIC DEVICES

This application claims the benefit of priority to U.S. Provisional Application No. 60/422,824, filed on Oct. 30, 2002, the disclosure of which is herein incorporated by reference.

BACKGROUND OF THE INVENTION

1. Field of the Invention

The present invention relates generally to the field of optical attenuation devices for use in optical systems. In particular, the present invention relates to a control system for an electrochromic device.

2. Background Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on a copper conductor.

Many conventional electrical networks are being upgraded to optical networks to take advantage of increased speed and efficiency. Optical communication networks use lasers to create light which is then modulated to convey information. One of the many components of an optical communications network is an optical attenuator. Optical attenuators control the intensity of one or more wavelengths of light within an optical system. One use for optical attenuators is in combination with an optical receiver having a photodetector and a preamplifier. The optical attenuator can be used to attenuate the incoming optical signal if the intensity of the signal exceeds a specified threshold. In this manner, the intensity of the incoming signal is brought in line with the dynamic range of the components of the optical receiver, and avoids the need of using more expensive receivers that would have larger dynamic operating ranges.

In addition to the foregoing use of optical attenuators, it is sometimes necessary to recalibrate or replace one or more of the lasers generating light in the system. To avoid data corruption, it is necessary to completely extinguish the laser's light from the optical system before recalibration or replacement. Optical attenuators are capable of extinguishing the laser's light by blocking it from entering the remainder of the optical system. There are numerous general methods of attenuating or completely extinguishing light, including polarization, reflection, diffusion, etc. In addition, it is often necessary to control the intensity of a particular wavelength or channel of light entering a fiber. Although it is possible to simply adjust the electrical current feeding a laser to adjust the output intensity, this is not desirable because this method of attenuation will affect the bandwidth capabilities of the laser. Therefore, it is necessary to use a variable optical attenuator to attenuate or adjust the output intensity of a particular laser.

One type of attenuator uses an electrochromic (EC) window to attenuate light that is transmitted through the window. An EC window attenuates the amount of light that is allowed to transmit through the window as a function of the input voltage that is applied to the window. This type of attenuator does not use moving parts nor does it change the polarization in any way to attenuate the incoming light. An EC window utilizes a particular crystalline structure that reflects and refracts light in such a way as to attenuate the light when a voltage is applied across the window. Many applications for EC windows require them to maintain a particular attenuation level for a long period of time. One of the difficulties associated with controlling the attenuation provided by an electrochromic attenuation device is that the attenuation is exponentially related to the voltage applied to the attenuation device. Accordingly, achieving an accurate and prolonged level of attenuation has been difficult using conventional approaches. Moreover, conventional attenuation techniques involve applying a particular voltage to the EC window for the entire duration of active operation of the EC window in order to maintain the proper attenuation level.

Therefore, there is a need in the industry for an EC control circuit that minimizes the amount of power that must be expended in order to maintain a particular attenuation level. In addition, the control circuit should be relatively easy to manufacture and implementable in a wide variety of applications.

SUMMARY OF THE INVENTION

The present invention is directed to a system and method for controlling an electrochromic device. The system comprises a light source such as a laser device that produces an input light signal, and an electrochromic window configured to attenuate the input light signal by a certain amount and transmit a resulting attenuated light signal. An optical detector is configured to detect an optical property of the attenuated light signal, and a power module is connected to the electrochromic window and the detector. The power module generates a pulse-width modulated power signal and inputs the modulated power signal to the electrochromic window.

In a method of controlling an electrochromic device according to the invention, a light source produces an input light signal that is directed to an electrochromic window configured to attenuate the light signal. The attenuated light signal is transmitted from the electrochromic window to an optical detector configured to detect an optical property of the attenuated light signal. A pulse-width modulated power signal is directed to the electrochromic window. The power signal is modulated by an amount based on the detected optical property of the attenuated light signal.

One embodiment of a control circuit for an electrochromic device comprises a substrate having an upper surface, a preamp integrated circuit on the upper surface of the substrate, and an insulator on the upper surface of the substrate and adjacent to the preamp integrated circuit. One or more conductive posts are electrically connected to the preamp integrated circuit. An electrochromic window is interposed between first and second layers of a transparent material. The electrochromic window is in electrical communication with the preamp integrated circuit.

These and other features of the present invention will become more fully apparent from the following description and appended claims, or may be learned by the practice of the invention as set forth hereinafter.

BRIEF DESCRIPTION OF THE DRAWINGS

In order to illustrate the manner in which the advantages and features of the invention are obtained, a description of the invention will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In general, the present invention relates to an electrochromic (EC) control system that minimizes the amount of power required to operate an electrochromic window for use in attenuating light. The control system capitalizes on the slow response time of an electrochromic window by using a pulse-width modulation (PWM) to drive the EC window rather than a standard constant signal. By modulating the input signal at a rate that is just fast enough to maintain the required light attenuation of the EC window, the power transferred to the EC window is minimized. Also, while embodiments of the present invention are described in the context of optical attenuation for optical networking, it will be appreciated that the teachings of the present invention are applicable to other applications as well. For example, EC windows are commonly used in place of traditional glass windows to attenuate sunlight at particular times of the day or in response to temperature.

Reference will now be made to the drawings to describe presently preferred embodiments of the invention. It is to be understood that the drawings are diagrammatic and schematic representations of the embodiments, and are not limiting of the present invention, nor are they necessarily drawn to scale.

Figure 1A:
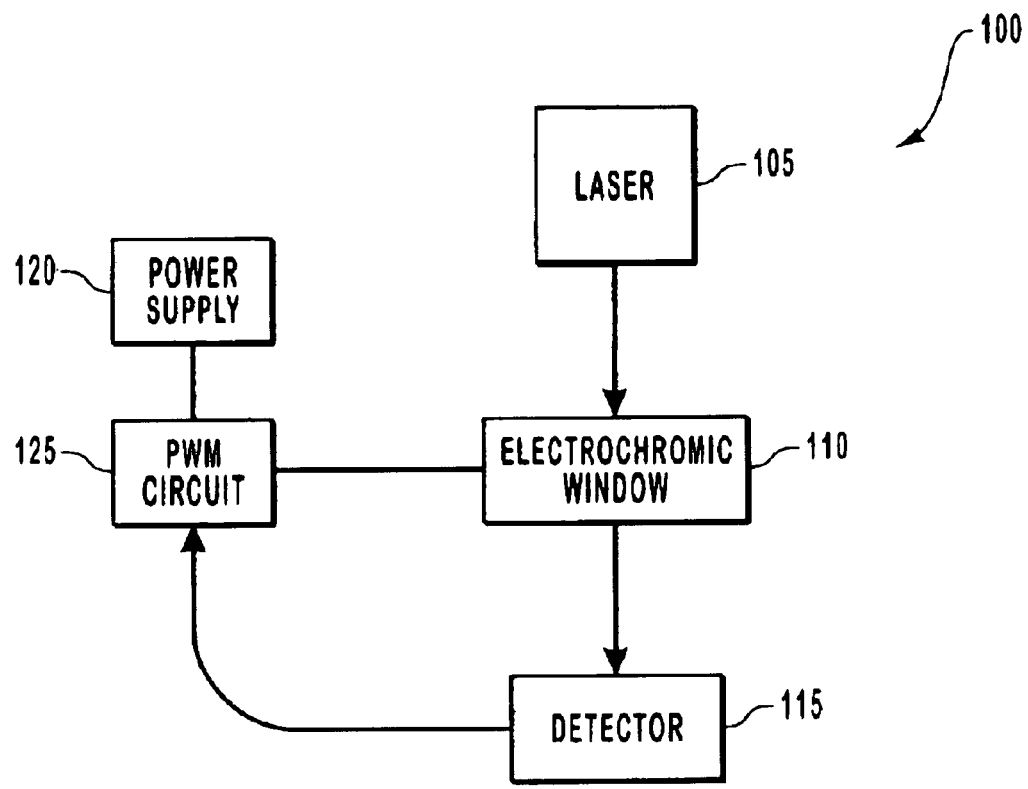
FIG. 1 illustrates a functional block diagram of one embodiment of an electrochromic control system that utilizes a pulse-width modulation (PWM) circuit in order to minimize the power required to operate an electrochromic window.
Figure 1B:
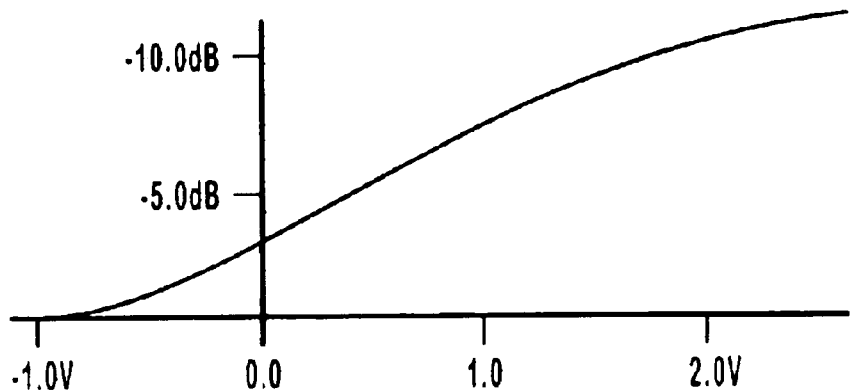

FIG. 1 is a functional block diagram illustrating one embodiment of an electrochromic control system 100 that utilizes pulse-width modulation (PWM) in order to minimize the power required to operate the electrochromic window. The illustrated control system 100 configuration is designed for use in optical communication systems. The control system 100 includes a light source such as a laser 105, an EC window 110, an optical detector 115, and a power module that includes a PWM circuit 125 and a power supply 120. The laser 105 generates a light signal that digitally encodes information in one or more wavelength channels. The laser 105 can be any laser source, including gas and semiconductor based lasers. The light signal is transmitted from the laser 105 into the EC window 110. The EC window 110 attenuates the light signal by a specified amount in order to lower the overall power or irradiance of the light signal. This does not affect the digital information that is encoded within the light signal's channels, since attenuation involves blocking a certain percentage of the overall light signal's power as opposed to blocking or filtering specific wavelengths of the light signal. The EC window 110 attenuates the light signal by an amount mathematically related to the amount of voltage applied upon it from the PWM circuit 125. The higher the voltage applied upon the EC window 110, the larger the amount of attenuation generated by the EC window 110 with respect to the light signal. An example of this relationship is represented in the graph of FIG. 1B.

The unattenuated portion of the light signal transmits through the EC window 110 onto the detector 115. The detector is an optical device, such as a charge-coupled device (CCD) array, that measures the power of the light signal over a one or two-dimensional area. Alternatively, the light signal may also be transmitted to another location in addition to the detector 115. The power measurement made by the detector 115 is then electrically communicated or transferred to the PWM circuit 125. The PWM circuit 125 controls the distribution of electricity from the power supply 120 to the EC window 110 in such a way as to minimize the power used by the EC window. The PWM circuit 125 modulates the voltage from the power supply 120 in a pulse-width modulated manner such that the modulation rate is faster than the total decay rate of the EC window 110. In other words, the period between pulses in the voltage is selected to be less than the time that it takes for the attenuation activity of the EC window to significantly decay. By continually pulsing the voltage onto the EC window 110 in this manner, the overall attenuation level of the EC window 110 can be maintained around a particular value. Moreover, the use of pulse-width modulation of the voltage signal with the feedback provided by detector 115 enables the attenuation level to be controlled more accurately than the conventional technique of using a constant voltage, since the attenuation level is an exponential function of the voltage.

Figure 2:
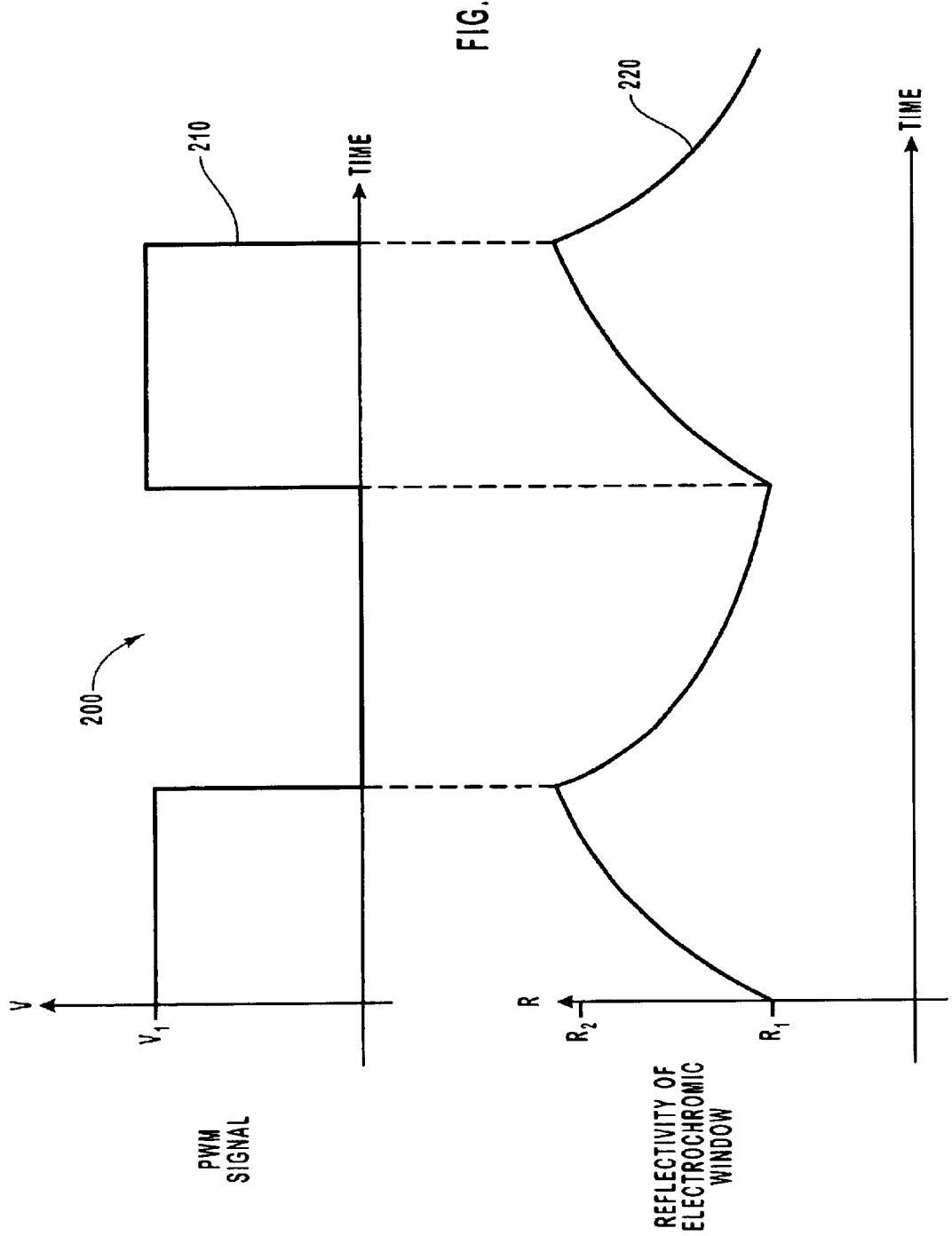
FIG. 2 illustrates the electrical signal generated by the PWM circuit in FIG. 1 and the reflectivity response of the electrochromic window.

Reference is next made to FIG. 2, which illustrates the electrical signal generated by the PWM circuit in FIG. 1 and the reflectivity or attenuation response of the electrochromic window, designated generally at 200. The graph 200 includes a PWM input signal 210 and a reflectivity or attenuation response 220. The PWM input signal 210 is the electrical voltage signal generated by the PWM circuit 125 versus time. As described above, the PWM circuit 125 modulates the input signal at a rate that is faster than the decay rate of the electrochromic window 110. The decay rate of the EC window is based on its ion mobility and diffusion rates. The modulation of the input signal can be done in many ways, including simply switching on and off the electrical connection between the power supply 120 and the electrochromic window 110. The PWM input signal 210 includes sections where the voltage is at a value V1 and other sections where the voltage is 0. The reflectivity or attenuation response 220 is the reflectivity or attenuation level of the electrochromic window 110 versus time. Reflectivity is the percentage of light that is reflected or attenuated by the electrochromic window 110. The remainder of the light that is not reflected or attenuated is transmitted through the electrochromic window 110.

The PWM input signal 210 and the reflectivity or attenuation response 220 are aligned in time to illustrate the affect the PWM input signal 210 has on the reflectivity or attenuation response 220. When the PWM input signal 210 is generating a voltage V1, the reflectivity or attenuation response 220 increases in a logarithmic manner to a reflectivity R2. Whereas, when the PWM input signal 210 is not generating any voltage, the reflectivity or attenuation response 220 decreases in a logarithmic manner to a reflectivity of R1. Therefore, by modulating the PWM input signal 210 at a certain rate, the reflectivity or attenuation can be maintained within a certain range between R1 and R2 without having to maintain a constant electrical voltage on the electrochromic window. The faster the modulation of the PWM input signal 210, the smaller the range between reflectivity values R1 and R2.

Figure 3:
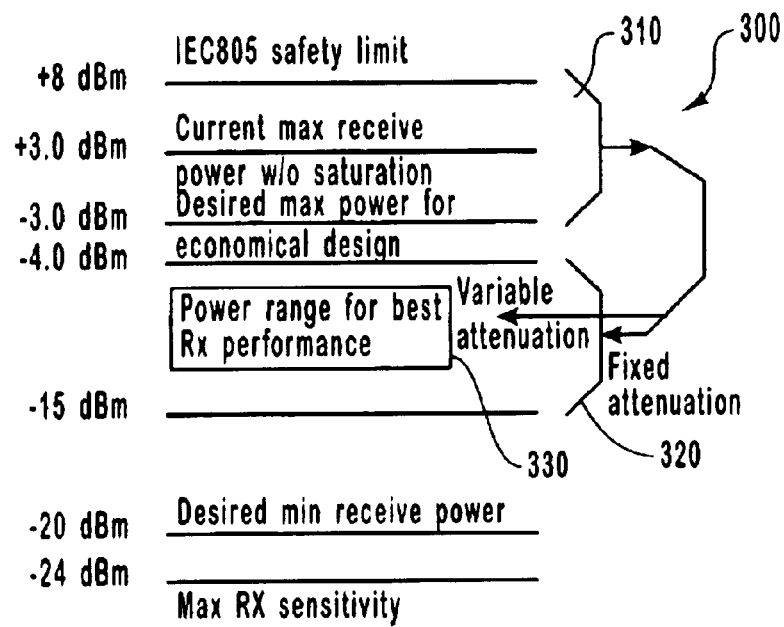
FIG. 3 illustrates a particular optimum power range for use in an optical communication system.

Reference is next made to FIG. 3, which illustrates one example of the range of power of an input optical signal that is received by an optical receiver. Chart 300 of FIG. 3 shows how an optical attenuator operated according to the invention can be used to reduce the power of an incoming optical signal to a level that is compatible with the optimal dynamic operating range of the optical receiver. While FIG. 3 illustrates one example of the reduction of the power of an optical signal to a specified range, it is to be understood that the principles of the invention can be used to arbitrarily attenuate the power of an optical signal as needed to comply with the operating requirements of an optical receiver or for other reasons. The chart 300 illustrates a range of power levels commonly used in optical attenuators. The chart 300 further includes an input power range 310, a fixed attenuation range 320, and a variable attenuation range 330. The input power range 310 represents a typical power level associated with an incoming optical signal that is received by the EC window. In this example, the input power range 310 is between −3 dBm and +8 dBm. The input power is then attenuated into either the fixed attenuation range 320 or the variable attenuation range 330, depending on whether the electrochromic window is used for fixed or variable attenuation. The fixed attenuation range 320 is between −4 dBm and −15 dBm, and the variable attenuation range 330 is between −6 dBm and −10 dBm.

Figure 4:
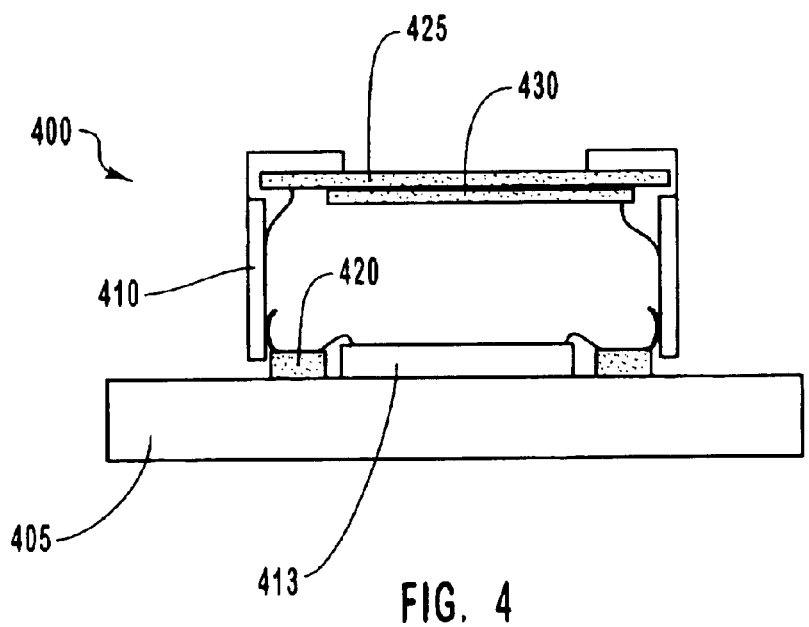
FIG. 4 illustrates one embodiment of an electrochromic control circuit mounted on a transistor outline can for use in an optical or electrical application.

Reference is next made to FIG. 4 which illustrates one embodiment of a electrochromic control circuit 400 mounted on an upper surface of a substrate such as a transistor outline (TO) can 405 for use in an optical or electrical application, such as in an optical receiver or transmitter. The control circuit 400 of FIG. 4 includes a preamp integrated circuit 413, an insulator 420, a conductive post 410, layers of transparent material 425 and 430 and an electrochromic window sandwiched between the layers of transparent material 425 and 430. This structure enables the electrochromic window to operate in a controlled environment. The electrochromic window is in electrical communication with the preamp integrated circuit which includes a PWM circuit.

The electrochromic control system of the present invention is more efficient than existing EC control circuits in that the level of attenuation can be more easily controlled. In contrast, conventional EC windows are operated using a fixed voltage, which makes it difficult to control the level of attenuation, which is related exponentially to the voltage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A control system for an electrochromic device, comprising:
    a light source that produces an input light signal;
    an electrochromic window configured to attenuate the input light signal by a certain amount and transmit a resulting attenuated light signal;
    an optical detector configured to detect an optical property of the attenuated light signal; and
    a power module connected to the electrochromic window and the detector, wherein the power module generates a pulse-width modulated power signal and inputs the power signal to the electrochromic window, the power signal modulated by an amount based on the detected optical property of the attenuated light signal.

2. The control system of claim 1, wherein the light source is a laser device.

3. The control system of claim 2, wherein the laser device comprises a gas laser or a semiconductor laser.

4. The control system of claim 1, wherein the input light signal digitally encodes information in one or more wavelength channels.

5. The control system of claim 1, wherein the detector comprises a charge-coupled device array that measures the power of the light signal over a one-dimensional area or a two-dimensional area.

6. The control system of claim 1, wherein the power module comprises a pulse-width modulated circuit that controls the distribution of electricity from a power supply to the electrochromic window.

7. The control system of claim 6, wherein the pulse-width modulated circuit modulates voltage from the power supply such that a modulation rate of the voltage is faster than a total decay rate of the electrochromic window.

8. A method of controlling an electrochromic device, comprising:
    providing a light source that produces an input light signal;
    directing the input light signal to an electrochromic window configured to attenuate the light signal;
    transmitting the attenuated light signal from the electrochromic window to an optical detector configured to detect an optical property of the attenuated light signal; and
    directing a pulse-width modulated power signal to the electrochromic window, wherein the power signal is modulated by an amount based on the detected optical property of the attenuated light signal.

9. The method of claim 8, wherein the light source is a laser device.

10. The method of claim 8, wherein the input light signal digitally encodes information in one or more wavelength channels.

11. The method of claim 8, wherein the detector comprises a charge-coupled device array that measures the power of the light signal over a one-dimensional area or a two-dimensional area.

12. The method of claim 8, wherein the pulse-width modulated power signal has a modulation rate that is faster than a decay rate of the electrochromic window.

13. A control circuit for an electrochromic device, comprising:
    a substrate having an upper surface;
    a preamp integrated circuit on the upper surface of the substrate;
    an insulator on the upper surface of the substrate and adjacent to the preamp integrated circuit;
    one or more conductive posts electrically connected to the preamp integrated circuit;
    a first layer of a transparent material;
    a second layer of a transparent material; and
    an electrochromic window interposed between the first and second layers of the transparent material, wherein the electrochromic window is in electrical communication with the preamp integrated circuit.

14. The control circuit of claim 13, wherein the substrate comprises a transistor outline can.

* * * * *